(12) United States Patent
Jeffries

(10) Patent No.: US 6,860,670 B2
(45) Date of Patent: Mar. 1, 2005

(54) END CONNECTOR ASSEMBLY

(75) Inventor: Mark S. Jeffries, Anderson, SC (US)

(73) Assignee: AVM, Inc., Marion, SC (US)

(*) Notice: Subject to any disclaimer, the term of this patent is extended or adjusted under 35 U.S.C. 154(b) by 22 days.

(21) Appl. No.: 10/203,120

(22) PCT Filed: Feb. 8, 2001

(86) PCT No.: PCT/US01/04234

§ 371 (c)(1),
(2), (4) Date: Nov. 8, 2002

(87) PCT Pub. No.: WO01/59347

PCT Pub. Date: Aug. 16, 2001

(65) Prior Publication Data
US 2003/0206766 A1 Nov. 6, 2003

Related U.S. Application Data

(60) Provisional application No. 60/181,006, filed on Feb. 8, 2000.

(51) Int. Cl.⁷ .............................. B60D 1/06; F16C 11/06
(52) U.S. Cl. .................... 403/122; 403/135; 403/143; 403/144; 403/319; 403/397; 280/511; 280/513
(58) Field of Search .................... 403/122, 143, 403/144, 319, 397; 280/511, 513, 507

(56) References Cited

U.S. PATENT DOCUMENTS

| | | | | |
|---|---|---|---|---|
| 2,793,881 A | * | 5/1957 | Albritton | 280/512 |
| 3,773,358 A | | 11/1973 | Butler et al. | 280/513 |
| 3,831,982 A | * | 8/1974 | Bernhardt et al. | 280/511 |
| 4,084,913 A | * | 4/1978 | Schenk | 403/141 |
| 4,114,922 A | * | 9/1978 | Holbrook | 280/512 |
| 4,225,261 A | | 9/1980 | Marx | 403/122 |
| 4,527,925 A | | 7/1985 | Bauer et al. | 403/143 |
| 4,568,216 A | | 2/1986 | Mizusawa et al. | 403/143 |
| 4,601,603 A | | 7/1986 | Nakayama | 403/143 |
| 4,705,425 A | * | 11/1987 | Okawa | 403/376 |
| 4,961,590 A | * | 10/1990 | Davenport | 280/477 |
| 5,056,276 A | * | 10/1991 | Nielsen et al. | 52/12 |
| 5,613,792 A | | 3/1997 | Terada et al. | 403/131 |
| 5,626,433 A | | 5/1997 | Iwamoto | 403/76 |
| 5,833,383 A | | 11/1998 | Bauman | 403/122 |

FOREIGN PATENT DOCUMENTS

GB 323976 1/1930

* cited by examiner

Primary Examiner—Daniel P. Stodola
Assistant Examiner—Ernesto Garcia
(74) Attorney, Agent, or Firm—McAndrews, Held & Malloy, Ltd.

(57) ABSTRACT

The end connector assembly (12) for a gas spring (44) enables the connector body to be connected with and disconnected from a ball (14) on the end of a ball stud (16) by relatively moving the connector body (26) and ball along a path generally parallel with the longitudinal axis of the gas spring (44) to which the connector body (26) is connected. The ball (14) enters the connector body (26) through an opening (32) in the body's front surface, that is, the surface generally perpendicular to the gas spring's longitudinal axis. A slot in the body's bottom surface, that is, the surface facing the ball (14), accommodates the shaft portion (22) of the ball stud (16), adjacent the ball (14), as the ball moves into or out of the connector body (26) through the opening (32). A retainer clip is connected with the connector body (26) and is selectively movable between a first or open position where the ball may be admitted into or withdrawn from the connector body (26) and a second or closed position where the ball is secured within the connector body by the retainer clip (62).

22 Claims, 2 Drawing Sheets

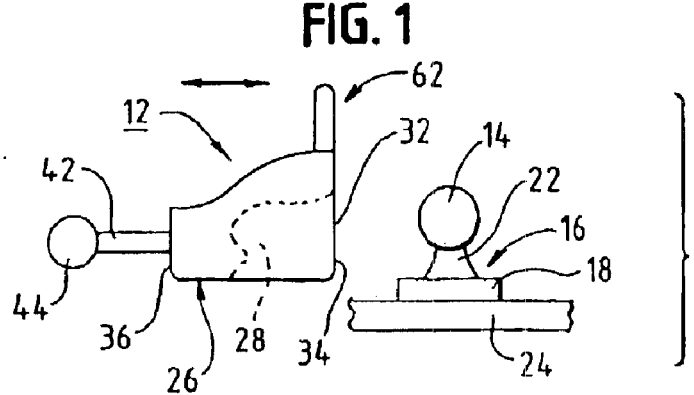
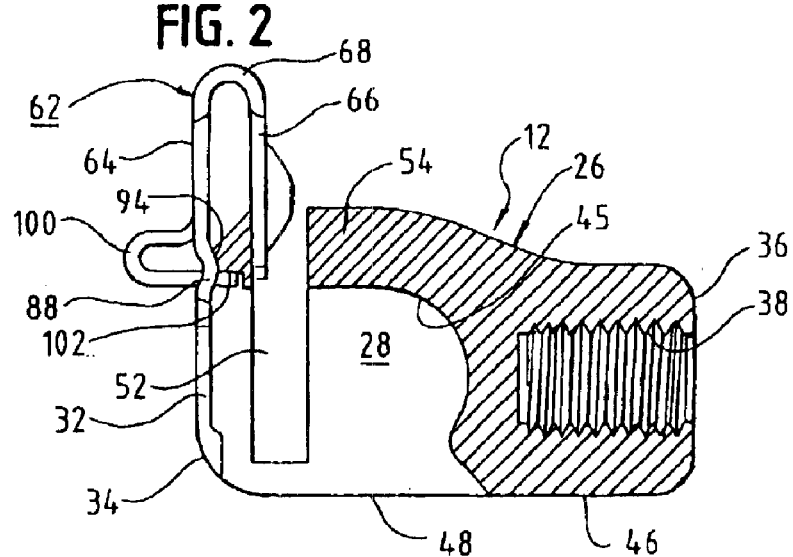
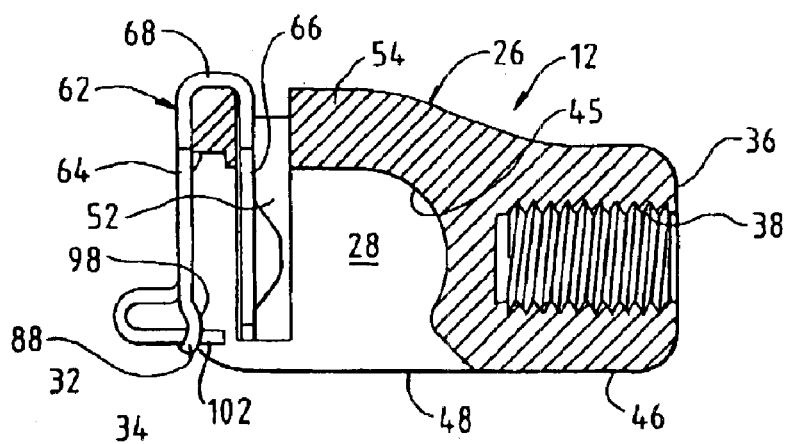

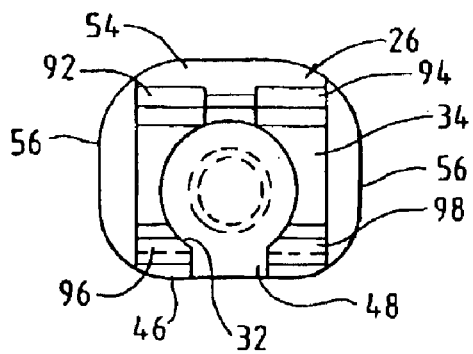
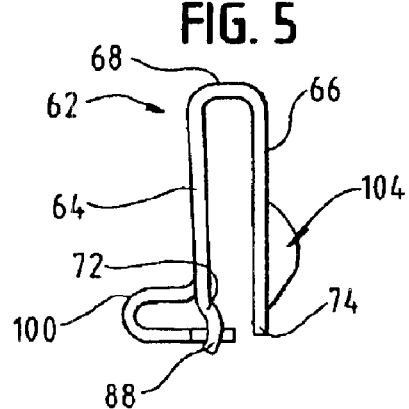
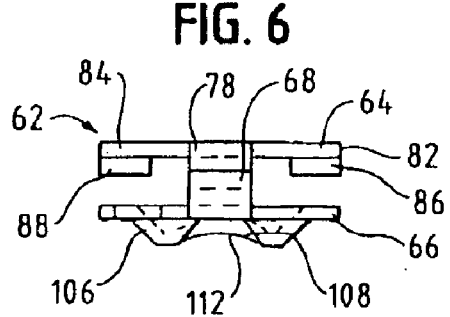
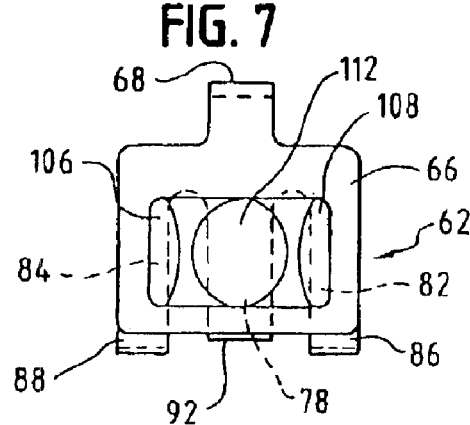
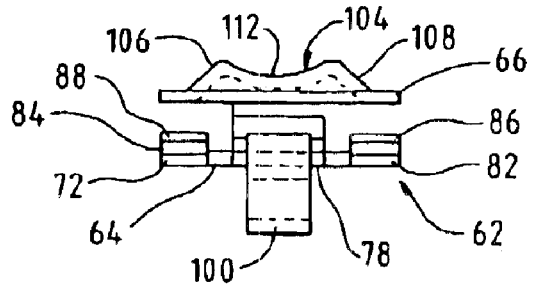

END CONNECTOR ASSEMBLY

CROSS-REFERENCE TO RELATED APPLICATIONS

This application claims the priority of United States provisional application Ser. No. 60/181,006, filed Feb. 8, 2000. The entire disclosure of the provisional application, referred to above, is hereby incorporated by reference.

BACKGROUND OF THE INVENTION

The present invention relates to end connector assemblies that are adapted to be connected with and disconnected from the ball of a ball stud, and more particularly, to end connector assemblies that are adapted for use with gas springs employed in automotive applications.

End connector assemblies have been used for years in many applications. These assemblies have been and are utilized to mechanically interconnect relatively movable parts. Increasingly, such assemblies have been employed for use with gas springs in the automotive field, where the gas springs are utilized to control the positioning of relatively movable parts. Examples of end connector assemblies, which are usable in automotive applications, are disclosed in U.S. Pat. Nos. 5,372,446; 5,417,512; and 5,676,484. The disclosures of these patents are incorporated herein by reference.

In end connector assemblies currently being used with gas springs in automotive applications, the ball of a ball stud is inserted into the connector body along a path normal to the longitudinal axis of the gas spring, that is, the axis of the gas spring shaft. In most current connector assemblies, once the connector body has properly engaged onto the ball, a tool is required to remove the connector assembly from the ball stud. The structures of currently available gas spring connector assemblies make it inconvenient, time consuming and difficult for a person to remove a gas spring end connector assembly from a ball stud.

An example of a situation of where the facile removal of a gas spring end connector assembly from a ball stud would be particularly desirable and helpful is where the gas spring is used to control the positioning of a tonneau cover or lid such as those used to cover the bed of a pickup truck. When the gas spring is fully extended, the tonneau cover is opened to a given angle. Removal of the gas spring end connector assembly would allow the cover to be raised more fully so as to provide more open space for loading and unloading the pickup truck bed. This full raising of the tonneau cover requires a temporary disconnection of one of the gas spring end connector assemblies. Additionally, full removal of the tonneau cover is sometimes desired in order to transport large loads in the truck bed. This also requires temporary disconnection of one of the gas spring end connector assemblies.

Gas springs are frequently installed on vehicles so as to be close as possible to adjacent parts of the vehicle and as unobtrusive as practicable. Having to disconnect and reconnect a connector assembly to the ball stud by moving the connector body along a path generally parallel to the longitudinal axis of the ball stud is often difficult and time consuming.

A need has long existed for an end connector assembly that could be conveniently and facially disconnected from and then reconnected with a ball stud in the "field" and by movement along a path substantially parallel with the longitudinal axis of the gas spring on which the connector assembly is mounted.

SUMMARY OF THE INVENTION

In principal aspects, the improved end connector assembly of the present invention allows for the body of the connector assembly to be connected with, disconnected from and re-connected with the ball on a ball stud with a minimum of effort and time and by moving the connector assembly along a path generally aligned with or parallel with the longitudinal axis of the gas spring, that is, the longitudinal axis of the gas spring shaft. This invention is particularly advantageous when one desires to raise a tonneau cover beyond its normally fully-opened position—as when one desires to load and/or unload oversized cargo into or from the pickup truck bed—since the connector body may be easily disconnected from the fixed ball stud and then later re-connected with the fixed ball stud when the cover is to be lowered back to its normal, fully opened position.

A novel retainer clip or gate, which is disposed in the front of the connector body, is readily movable between a first or open position and a second or closed position. In its open position, the retainer clip permits the connector body to be moved, relative to the ball, in a direction generally parallel to the longitudinal axis of the gas spring. In its closed position, the retainer clip prevents the ball from being withdrawn from within the connector body. The retainer clip includes a "handle" that facilitates movement of the retainer clip between the opened and closed positions and also includes a detent, which cooperates with detent portions on the connector body, to retain the retainer clip selectively in either its open or closed position. In other words, the retainer clip may be moved between its open and closed positions and retained in a selective one of these positions simply by grasping the handle and without the need to use tools.

Accordingly, a primary object of the present invention is to provide an improved end connector assembly where the connector assembly may be easily and readily disconnected and re-connected with a ball stud.

Another object of the present invention is to provide an improved end connector assembly where the connector body is adapted to be connected with a ball, which has a predetermined diameter and which is on the end of a ball stud shaft; where the connector body is adapted to be connected with the end of a gas spring; where the connector body has an interior ball receiving socket cavity; where the connector body includes a generally first or front surface, that is, a surface which faces away from the gas spring when the connector body is connected with the gas spring; where this front surface includes a first opening which has a congruent shape and dimensions so that the ball and the adjacent portion of the ball stud shaft may pass through the first opening and into and out of the socket cavity along a path generally parallel with the longitudinal axis of the gas spring; and where a retainer clip may be connected with the connector body so as to selectively move between a first or open position in which the ball may pass into or out of the socket cavity through the first opening and a second or closed position in which the retainer clip prevents the passage of the ball out of the socket cavity through the first opening. A related object of the present invention is to provide an improved end connector assembly, as described, where the connector body includes a second surface that is adjacent the first surface and is disposed at an angle with respect to the longitudinal axis of the gas spring when the connector body is mounted on the gas spring and that includes a first slot which has a transverse dimension greater than that of the transverse dimension of the adjacent portion of the shaft portion of the ball stud and which extends from the first surface to adjacent the socket cavity.

Still another object of the present invention is to provide an improved end connector assembly, as described, where the retainer clip has a first section and a second section; where each of the sections have a first end and a second end; where in the first ends of the first and second sections are jointed by a hinge portion so that the retainer clip has a generally U-shaped cross section; where a portion of the socket cavity has a diameter substantially equal to that of the predetermined diameter of the ball; and where a portion of the second section has a shape that generally conforms to the outer shape of the ball so that the ball is held in the socket cavity portion when the ball is in the socket cavity and when the retainer clip is in its second or closed position.

Yet another object of the present invention is to provide a improved end connector assembly, as described, where the connector body includes a second slot that extends adjacent the first surface; where the second slot extends from a third surface, which is adjacent to the first surface, toward the second surface, and where the second section of the retainer clip is disposed or mounted in the second slot when the retainer clip is in its first or open position.

A further object of the present invention is to provide an improved end connector assembly, as described; where the retainer clip includes a detent portion; where the connector body includes a first detent portion; and where the retainer clip detent portion cooperates with the connector body's first detent portion when the retainer clip is in the first position so as to normally retain the retainer clip in the first position; where the connector body has a second detent portion; and where the retainer clip detent portion cooperates with the second detent portion of the connector body so as to normally retain the retainer clip in the second position.

These and other objects, benefits and advantages of the present invention will become apparent to those having skill in this art from the following description of the preferred embodiment of the present invention, taken in conjunction with the following drawings.

BRIEF DESCRIPTION OF THE DRAWINGS

FIG. 1 is a partial perspective view of an end connector assembly of the present invention, showing the position of the assembly, relative to a ball on the end of a ball stud, as the assembly is about to connect to (or has just been disconnected from) the ball;

FIG. 2 is a partial, longitudinal, axial cross-sectional view of the connector assembly of the present invention where the retainer clip in its open position;

FIG. 3 is a view similar to FIG. 2 where the retainer clip in its closed position;

FIG. 4 is a plan view of the front or ball entry/ball withdrawal end of the connector body of the present invention;

FIG. 5 is a side elevational view of the retainer clip of the present invention;

FIG. 6 is a top elevational view of the retainer clip of FIG. 5;

FIG. 7 is a rear or ball-engaging-side elevational view of the retainer clip of FIG. 5; and FIG. 8 is a bottom elevational view of the retainer clip of FIG. 5.

In the following detailed description of the preferred embodiment of the present invention, spatially orienting terms are used, such as "upper," "lower," "top," "bottom," "front," "rear," "inner," "outer," "upward," "downward," "vertical," "horizontal," and the like. It is to be understood that these terms are used for convenience of description of the preferred embodiment with reference to the views shown in the drawings. These terms do not necessarily describe the absolute location in space that any part, etc. so described, must or would assume in actual use.

DESCRIPTION OF THE PREFERRED EMBODIMENT

Referring now to FIG. 1, an end connector assembly 12 of the present invention is shown in a position where the assembly 12 is able to be readily connected with a ball 14 that is on the end of an integral ball stud 16. The ball 14 has a predetermined diameter and is supported on a base portion 18 of the ball stud 16 by a shaft portion 22. The ball stud 16 is secured to a relatively fixed surface 24 that may, for example, be a part of the bed of the pickup truck.

The assembly 12 includes a connector body or housing 26 that has a ball receiving socket cavity 28. The connector body 26 is preferably zinc die cast but, of course, could be made of other suitable materials and methods, such as from a strong, moldable plastic material.

An opening 32 (or first opening) in the front or first surface 34 of the connector body 26 has a size and shape and is dimensioned so as to permit the ball 14 to easily pass through the opening 32 and into or from the socket cavity 28. A rear surface 36 of the connector body 26 includes a threaded counterbore 38. The distal end of a reciprocally movable shaft 42 of a gas spring (shown diagrammatically at 44) may be threaded into the counterbore 38 so that the longitudinal axis of the shaft 42, and thus the longitudinal axis of the gas spring 44, are aligned with the longitudinal axis of the connector body 26. The plane of the opening 32 is generally perpendicular to the longitudinal axis of the connector body 26.

One of the principal advantages of the assembly of the present invention is that the connector assembly 12 may be readily connected to or disconnected from the ball 14 of the ball stud 16 by moving, the assembly 12 (and the connector body 26) in a direction parallel with the longitudinal axis of the gas spring 44. More particularly, the connector body 26 may be moved, relative to the ball 14, along a path perpendicular to the longitudinal axis of the ball stud 16 so that the ball 14 may pass through the opening 32 in the front surface 34 and into the ball receiving socket cavity 28. Similarly, the ball 14 may be withdrawn from the socket cavity 28 through the opening 32 by relatively moving the connector body 26 in the opposite direction, that is, by moving the connector body away from the ball 14 along a path parallel to the longitudinal axes of the gas spring 44 and the connector body 26.

Referring now to FIGS. 2 and 3, a portion 45 of the ball receiving socket cavity 28 has a spherical shape and is dimensioned generally the same as the outer shape and dimension of the ball 14. The surface portion 45 is generally adjacent the rear surface 36 and generally faces the front surface 34. When the ball 14 is in the socket cavity 28, it presses against the surface portion 45, as explained below, so as to eliminate possible vibrational noise due to relative movement between the ball 14 and the connector body 26.

A horizontal slot 48 (or first slot) is located in the bottom or second surface 46 of the connector body 26. The slot 48 extends from the front surface 34 to just beyond the socket cavity 28 and communicates with the opening 32. The slot's longitudinal axis is aligned with the longitudinal axis of the connector body 26. The plane of the horizontal slot 48 is generally parallel to the longitudinal axis of the connector body 26. The transverse width or side-to-side dimension of the slot 48 is slightly larger than the shaft portion 22, adjacent the ball 14, such that when the ball 14 is introduced into or removed from the socket cavity 28, the shaft portion 22 may be accommodated within the slot 48.

A second, vertical slot 52 begins in the upper or top wall 54 of the connector body 26 and extends downwardly through the upper portions of the connector body's side walls 56. The slot 52 is disposed adjacent and substantially parallel with the front surface 34 and communicates, at its lower end, with the socket cavity 28.

A retainer clip or gate 62, which is best illustrated in FIGS. 5–8, is utilized to selectively either retain the ball 14 within the socket cavity 28 or to permit the ball to be introduced into or to be withdrawn from the socket cavity 28 through the opening 32. More specifically and as shown in FIGS. 2 and 3, when the retainer clip 62 is in its first or open position, as illustrated in FIG. 2, the ball 14 may easily pass into and out of the cavity 28 through the opening 32. Alternatively, when the retainer clip 62 is in its closed or second position, as illustrated in FIG. 3, the retainer clip prevents the ball 14 from being removed from (or from entering into) the socket cavity 28 through the opening 32.

As best shown in FIGS. 5–8, the retainer clip 62 may preferably be made from tempered steel (Rockwell hardness C50) although it could also be made of other suitable materials. The retainer clip includes a front or first section 64 and a second or rear section 66. The first or upper ends of the sections 64 and 66 are joined by an integral, central hinge section or portion 68. As illustrated in FIGS. 2 and 3, the rear section 66 is disposed within the slot 52, and the front section 64 is disposed adjacent to and abutting the front surface 34. The lower ends 72 and 74 of the sections 64 and 66, respectively, tend to have spring-like flexibility such that when these section ends are moved from the position shown in FIG. 5, they tend to return to that position.

The lower end 72 of the front section 64 is divided into three "paddle"-like portions: a central portion 78 and two side portions 82 and 84. The lower ends of the side portions 82 and 84 each have a curved, generally "V" shaped "joggle" or detent 86 and 88, respectively. The detents 86 and 88 are disposed slightly inwardly (that is, toward the rear section 66) from the plane of the rest of the portions 82 and 84. When the retainer clip 62 is in a "relaxed" state (that is, when it is not mounted on the connector body), the distance between the detents 86 and 88 and the rear section 66 is less than the thickness of the portion of the connector body between the slot 52 and the front surface 34. Hence, when the retainer clip 62 is mounted in the slot 52, the detents 86 and 88 are "sprung" and forced against the front surface 34.

The front surface 34 includes a laterally spaced, upper pair of detent receiving grooves 92 and 94 and a laterally spaced, lower pair of detent receiving grooves 96 and 98. The grooves 92, 94, 96 and 98 are located, on the front surface 34, above and below, respectively and on opposite sides of the opening 32. The grooves 92–98 are horizontally disposed and are sized so that they may be selectively engaged by the detents 86 and 88. More particularly, the detents 86 and 88 resiliently engage the slots 96 and 98, respectively, when the retainer clip 62 is in its closed (FIG. 3) position. Similarly, when the retainer clip 62 is in its open (FIG. 2) position, the detents 86 and 88 resiliently engage the grooves 92 and 94, respectively. The engagement between the detents 86 and 88, and the grooves 92, 94 or 96, 98 hold the retainer clip 62 in its open or closed position, as the case may be.

The lower end of the central portion 78 of the front section 64 is curved so as to define a generally "U" shaped "tongue" or handle 100 for use in moving the retainer clip 62 between its open and its closed positions, as shown in FIGS. 3 and 2, respectively. When the retainer clip is in its open position, the rearwardly directed, distal end 102 of the handle 100 abuts an upper portion of the opening 32 so as to prevent further upward movement of the retainer clip relative to the connector. The retainer clip 62 may, however, be removed, if desired, from the connector body 26 by pulling the handle 100 away from the rear section 66 so that the end 102 "clears" the opening 32 in the front surface 34. Because of the inherent spring biasing effect of the hinge section 68, a positive, relatively strong pulling force on the handle 100 is required to effect the removal of the retainer clip 62 from the connector housing 26, but no tools are needed.

The rear section 66 of the retainer clip 62 includes a ball supporting protrusion 104. More specifically, the protrusion 104 includes side portions 106 and 108 and a central portion 112. The rearwardly facing or ball facing surfaces of the portions 106, 108 and 112 are curved and dimensioned so that they conform to the spherical surface of the ball 14 when the ball 14 is within the socket cavity 28. The dimensions of the protrusion 104, the ball 14 and the socket cavity 28 are such that when the ball 14 is in the socket cavity 28 and the retainer clip 62 is in its closed position, the ball rests between portions 106 and 108 and the portion 112 contacts the surface of the balls 14 and hold the ball 14 firmly against the spherical portion 45 of the socket cavity 28.

While the preferred embodiment of the present invention has been described and illustrated above, it should be understood that the present invention is not limited to this preferred embodiment, since modifications can be made by those skilled in the art, particularly in light of the foregoing teachings. It is therefore contemplated that the appended claims will include all such modifications, which come within the spirit and the scope of the present invention.

I claim:

1. An end connector assembly that is adapted to be connected with and disconnected from a ball on the end of a ball stud, the ball stud having a shaft portion adjacent the ball, where the ball has a predetermined diameter and where the shaft portion of the ball stud has a smaller transverse dimension than the predetermined diameter of the ball, and that is adapted to be mounted on the end of a gas spring, where the gas spring has a longitudinal axis, the end connector assembly comprising:

a connector body that has an interior, ball receiving socket cavity; that includes a first surface, which faces generally opposed from the gas spring when the connector body is mounted on the gas spring; and that has a first opening in the first surface, with the first opening having a shape and dimensions so that the ball and the adjacent shaft portion of the ball stud may selectively pass through the first opening from the exterior of the connector body into the socket cavity along a path generally parallel with the gas spring longitudinal axis when the connector body is mounted on the end of the gas spring and from the socket cavity through the first opening to the exterior of the connector body along a path generally parallel with the gas spring longitudinal axis when the connector body is mounted on the end of a gas spring; and a retainer clip that may be connected with the connector body so as to be selectively moved between a first position, where a ball may pass through the first opening, and a second position, where the retainer clip prevents the passage of a ball out of the socket cavity through the first opening;

wherein the retainer clip includes a detent portion; wherein the connector body includes a first detent portion; and wherein the retainer clip detent portion cooperates with the connector body first detent portion when the retainer clip is in the first position so as to normally retain the retainer clip in the first position.

2. The end connector assembly as described in claim 1 wherein the connector body has a second detent portion; and wherein the retainer clip detent portion cooperates with the second detent portion of the connector body so as to normally retain the retainer clip in the second position.

3. An end connector assembly that is adapted to be connected with and disconnected from a ball on the end of a ball stud, the ball stud having a shaft portion adjacent the ball, where the ball has a predetermined diameter and where the shaft portion of the ball stud has a smaller transverse dimension than the predetermined diameter of the ball, and that is adapted to be mounted on the end of a gas spring, where the gas spring has a longitudinal axis, the end connector assembly comprising:

a connector body that has an interior, ball receiving socket cavity; that includes a first surface, which faces generally opposed from the gas spring when the connector body is mounted on the gas spring; and that has a first opening in the first surface, with the first opening having a shape and dimensions so that the ball and the adjacent shaft portion of the ball stud may selectively pass through the first opening from the exterior of the connector body into the socket cavity along a path generally parallel with the gas spring longitudinal axis when the connector body is mounted on the end of the gas spring and from the socket cavity through the first opening to the exterior of the connector body alone a path generally parallel with the gas spring longitudinal axis when the connector body is mounted on the end of a gas spring; and a retainer clip that may be connected with the connector body so as to be selectively moved between a first position, where a ball may pass through the first opening, and a second position, where the retainer clip prevents the passage of a ball out of the socket cavity through the first opening;

wherein the retainer clip includes a first section and a second section; wherein each of the first and second sections have a first end and a second end; and wherein the first ends of the first and second sections are joined by a hinged portion so that the retainer clip has a generally U-shaped, cross-section.

4. The end connector assembly as described in claim 3 wherein the retainer clip includes a detent portion adjacent the second end of the first section; wherein the connector body includes a first detent portion; and wherein the retainer clip detent portion cooperates with the connector body first detent portion when the retainer clip is in the first position so as to normally retain the retainer clip in the first position.

5. The end connector assembly as described in claim 4 wherein the connector body has a second detent portion; and wherein the retainer clip detent portion cooperates with the second detent portion of the connector body so as to normally retain the retainer clip in the second position.

6. The end connector assembly as described in claim 3 wherein a portion of the socket cavity has a diameter substantially equal to that of the predetermined diameter of the ball; and wherein the second section of the retainer clip includes a portion that is disposed adjacent to and serves to hold the ball against the socket cavity portion when the retainer clip is in the second position and when the ball is in the socket cavity.

7. The end connector assembly as described in claim 3 wherein the connector body includes a third surface adjacent the first surface; wherein the connector body includes a second slot that is adjacent the first surface; wherein the second slot extends from the third surface toward a second surface; said wherein the second section of the retention clip is mounted within the second slot when the retainer clip is in the first position.

8. The end connector assembly as described in claim 7 wherein the first section of the retainer clip is disposed adjacent the first surface; and wherein the hinge portion of the retainer clip is disposed between the second slot and the first surface and adjacent the third surface when the retainer clip is in the first position.

9. An end connector assembly that is adapted to be connected with and disconnected from a ball on the end of a ball stud, the ball stud having a shaft portion adjacent the ball, where the ball has a predetermined diameter and where the shaft portion of the ball stud has a smaller transverse dimension than the predetermined diameter of the ball, and that is adapted to be connected with the end of a gas spring, where the gas spring has a longitudinal axis, the end connector assembly comprising:

a connector body that has a longitudinal axis and an interior, ball receiving socket cavity; that includes a first surface which faces generally opposed from the gas spring when the connector body is mounted on the gas spring, and that has a first opening in the first surface, with the first opening having a shape and dimensions so that the ball and the adjacent shaft portion of the ball stud may selectively pass through the first opening from the exterior of the connector body into the socket cavity and from the socket cavity to the exterior of the connector body along a path generally parallel with the longitudinal axis of a connected gas spring;

the connector body including a second surface that is adjacent to the first surface, and that includes a first slot therein which has a transverse dimension greater than that of the transverse dimension of the shaft portion of the ball stud, which extends between the first surface and adjacent the socket cavity, and which is adapted to selectively receive the shaft portion of the ball stud along a path generally parallel with the longitudinal axis of the connected gas spring;

a retainer clip that may be connected with the connector body so as to be selectively moved between a first position, where a ball may pass through the first opening, and a second position, where the retainer clip prevents the passage of a ball out of the socket cavity through the first opening;

wherein the retainer clip includes a first section and a second section; wherein each of the first and second sections have a first end and a second end; and wherein the first ends of the first and second sections are joined by a hinged portion so that the retainer clip has a generally U-shaped cross-section.

10. The end connector assembly as described in claim 9 wherein the connector body includes a third surface adjacent the first surface; wherein the connector body includes a second slot that is adjacent the first surface; wherein the second slot extends from the third surface toward the second surface; and wherein the second section of the retention clip is mounted within the second slot when the retainer clip is in the first position.

11. The end connector assembly as described in claim 10 wherein the plane of the first opening in the first surface is generally perpendicular to the longitudinal axis of the connector body; wherein the plane of the first slot is generally parallel to the longitudinal axis of the connector body.

12. The end connector assembly as described in claim 11 wherein tho retainer clip includes a detent portion adjacent the second end of the first section; wherein the connector body includes a first detent portion; and wherein the retainer clip detent portion cooperates with the connector body first detent portion when the retainer clip is in the first position so as to normally retain the retainer clip in the first position.

13. The end connector assembly as described in claim 12 wherein the connector body has a second detent portion; and wherein the retainer clip detent portion cooperates with the second detent portion of the connector body so as to normally retain the retainer clip in the second position.

14. The end connector assembly as described in claim 3 wherein a portion of the socket cavity has a diameter substantially equal to that of the predetermined diameter of the ball; and wherein the second section of the retainer clip includes a portion that is disposed adjacent to and serves to hold the ball against the socket cavity portion when the retainer clip is in the second position and when the ball is in the socket cavity.

15. The end connector assembly as described in claim 14 wherein the first section of the retainer clip includes a handle portion for use in moving the retainer clip between the first and second positions.

16. A retainer clip for use with an end connector assembly that is adapted to be connected with and disconnected from a ball on the end of a ball stud, and that is adapted to be mounted on the end of a gas spring, where the gas spring has a longitudinal axis; where the end connector assembly includes a connector body that has an interior, ball receiving socket cavity; that includes a first surface, and that has a first opening in the first surface, with the first opening having a shape and dimensions so that the ball and the adjacent shaft portion of the ball stud may selectively pass through the first opening from the exterior of the connector body into the socket cavity and from the socket cavity to the exterior of the connector body along a path generally parallel with the gas spring longitudinal axis; when the connector body is mounted on the end of the gas spring, and that includes a slot that is disposed between the first surface and the end of the gas spring; the retainer clip having a body that may be connected with the connector body so that the retainer clip may be selectively moved in and along the slot between a first position, where the ball may pass through the first opening, and second position, whore the retainer clip prevents the passage of the ball out of the socket cavity through the first opening, the retainer clip body including a first section and a second section, with each of the first and second sections having a first end and a second end and with the first ends of the first and second sections being joined together in an integral spring portion so that at learnt one of the second ends of the first and second sections has a spring flexibility relative to the other second end; wherein the retainer clip includes a detent portion; wherein the connector body includes a first detent portion; and wherein the retainer clip detent portion cooperates with the connector body first detent portion when the retainer clip is in the first position so as to normally retain the retainer clip in the first position.

17. The retainer clip as described in claim 16 wherein the connector body has a second detent portion; and wherein the retainer clip detent portion cooperates with the second detent portion of the connector body so as to normally retain the retainer clip in the second position.

18. The retainer clip as described in claim 16 wherein the retainer clip includes a handle portion for use in moving the retainer clip between the first and second positions.

19. An end connector assembly that is adapted to be connected with and disconnected from a ball on the end of a ball stud, the ball stud having a shaft portion adjacent the ball, where the ball has a predetermined diameter and where the shaft portion of the ball stud has a smaller transverse dimension than the predetermined diameter of the ball, and that is adapted to be mounted on the end of a gas spring, where the spring has a longitudinal axis, the end connector assembly comprising:

a connector body that has an interior, ball receiving socket cavity; that includes a first surface, which faces generally opposed from the gas spring when the connector body is mounted on the gas spring; and that has a first opening in the first surface, with the first opening having a shape and dimensions so that the ball and the adjacent shaft portion of the ball stud may selectively pass through the first opening from the exterior of the connector body into the socket cavity along a path generally parallel with the gas spring longitudinal axis when the connector body is mounted on the end of the gas spring and from the socket cavity through the first opening to the exterior of the connector body along a path generally parallel with the gas spring longitudinal axis when the connector body is mounted on the end of a gas spring; and a retainer clip that may be connected with the connector body so as to be selectively moved between a first position, where a ball may pass though the first opening, and a second position, where the retainer clip prevents the passage of a ball out of the socket cavity through the first opening;

wherein the plane of the first opening in the first surface is generally perpendicular to the longitudinal axis of the connector body; and wherein the plane of the first slot is generally parallel to the longitudinal axis of the connector body; and wherein the retainer clip includes a first section and a second section; wherein each of the first and second sections have a first end and a second end; and wherein the first ends of the first and second sections are joined by a hinged portion so that the retainer clip has a generally U-shaped cross-section.

20. The end connector assembly as described in claim 19 wherein the connector body includes a third surface adjacent the first surface; wherein the connector body includes a second slot that is adjacent the first surface; wherein the second slot extends from the third surface toward the second surface; and wherein the second section of the retention clip is mounted within the second slot when the retainer clip is in the first position.

21. The end connector assembly as described in claim 20 wherein the plane of the first opening in the first surface is generally perpendicular to the longitudinal axis of the connector body; wherein the plane of the first slot is generally parallel to the longitudinal axis of the connector body.

22. The end connector assembly as described in claim 21 wherein the retainer clip includes a detent portion adjacent the second end of the first section; wherein the connector body includes a first detent portion; and wherein the retainer clip detent portion cooperates with the connector body first detent portion when the retainer clip is in the first position so as to normally retain the retainer clip in the first position.

* * * * *